United States Patent
Hayashi (10) Patent No.: US 10,211,705 B2
(45) Date of Patent: Feb. 19, 2019

(54) ROTATING ELECTRICAL MACHINE

(71) Applicant: DENSO CORPORATION, Kariya, Aichi-pref. (JP)

(72) Inventor: Jirou Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 391 days.

(21) Appl. No.: 15/001,639

(22) Filed: Jan. 20, 2016

(65) Prior Publication Data

US 2016/0218596 A1   Jul. 28, 2016

(30) Foreign Application Priority Data

Jan. 26, 2015  (JP) .................................. 2015-12484

(51) Int. Cl.
| | | |
|---|---|---|
| H02K 11/00 | (2016.01) |
| H02K 9/22 | (2006.01) |
| H02K 11/33 | (2016.01) |
| H02K 5/16 | (2006.01) |
| B62D 5/04 | (2006.01) |

(52) U.S. Cl.
CPC ............... *H02K 9/22* (2013.01); *B62D 5/04* (2013.01); *B62D 5/046* (2013.01); *H02K 5/161* (2013.01); *H02K 11/33* (2016.01)

(58) Field of Classification Search
CPC ...................................................... H02K 9/22
USPC ....................................................... 310/68 R
See application file for complete search history.

(56) References Cited

U.S. PATENT DOCUMENTS

| | | | | |
|---|---|---|---|---|
| 5,814,909 A * | 9/1998 | Yamada | ................. | H02K 11/33 310/52 |
| 6,175,171 B1 * | 1/2001 | Rupp | ....................... | H02K 5/18 165/80.3 |
| 6,836,036 B2 * | 12/2004 | Dube | .................... | H02K 1/148 180/65.51 |
| 7,812,487 B2 * | 10/2010 | Bi | ...................... | H05K 7/20409 310/64 |
| 8,324,769 B2 * | 12/2012 | Clendenen | ............ | H02K 11/33 310/68 D |
| 8,729,751 B2 * | 5/2014 | Telakowski | .............. | H02K 1/32 310/61 |
| 9,392,732 B2 * | 7/2016 | Hara | ........................ | H02K 5/22 |
| 2008/0277191 A1 | 11/2008 | Kasai | | |
| 2013/0026867 A1 * | 1/2013 | Deguchi | .................. | H02K 9/19 310/53 |

(Continued)

FOREIGN PATENT DOCUMENTS

| | | | |
|---|---|---|---|
| JP | S61-85788 A | 5/1986 |
| JP | S63-45900 A | 2/1988 |

(Continued)

*Primary Examiner* — Alexander Talpalatski (57) ABSTRACT

A stator is fixed to a frame of an electric motor. A rotor is rotatably mounted to the frame to face the stator in a radial direction. A heat sink, to which a control substrate is attached, is mounted in one end of the frame. A heat transfer plate is interposed between heat-generating elements formed on the control substrate and the heat sink to absorb variations in a distance therebetween, the heat transfer plate allow heat to be transmitted from the heat-generating elements to the heat sink. The heat transfer plate includes a frame body mounted to the heat sink and a plurality of contact strips that flexibly protrude from the frame body and that abut the heat-generating elements.

9 Claims, 9 Drawing Sheets

(56) References Cited

U.S. PATENT DOCUMENTS

| | | | | |
|---|---|---|---|---|
| 2013/0088128 A1* | 4/2013 | Nakano | ............... | B62D 5/0406 |
| | | | | 310/68 R |
| 2013/0257232 A1 | 10/2013 | Tomizawa et al. | | |
| 2014/0225482 A1* | 8/2014 | Hara | ..................... | H02K 5/22 |
| | | | | 310/68 D |
| 2016/0036306 A1 | 2/2016 | Yamasaki et al. | | |

FOREIGN PATENT DOCUMENTS

| JP | 2001-237578 A | 8/2001 |
|---|---|---|
| JP | 2006-3087 A | 1/2006 |
| JP | 2010-004598 A | 1/2010 |
| JP | 2013-090501 A | 5/2013 |
| JP | 2013-106421 A | 5/2013 |

* cited by examiner

ROTATING ELECTRICAL MACHINE

CROSS REFERENCE TO RELATED APPLICATION

The present application is based on Japanese Patent Application No. 2015-012484 filed on Jan. 26, 2015, disclosure of which is incorporated herein by reference.

TECHNICAL FIELD

The present disclosure relates to a rotating electrical machine that generates electricity by rotating a rotor, or that rotates a rotor when supplied with electric power.

BACKGROUND

Conventionally, a rotating electrical machine includes a motor housing that opens in one end in an axis of rotation direction. A stator is fixed to an inner circumferential surface of the motor housing. A rotor is rotatably mounted in the motor case so as to face the stator in a radial direction. See, for example, JP 2013-207968. In such a conventional rotating electrical machine, a heat sink is disposed at an opening of the motor housing. A control substrate that controls a rotation of a rotor is mounted to the heat sink. Heat generated by circuit elements of the control substrate are dissipated through the heat sink.

SUMMARY

In rotating electrical machines, heat is generated in the stator due to copper losses and iron losses, heat is generated in the rotor due to mechanical losses, and heat is also generated at the control substrate. The control substrate of rotating electrical machines also includes power modules and the like for controlling electrical power to the stator. These power modules supply energy to the stator through pulse width modulation (PWM) control to control the rotation of the rotor. As a result, the amount of heat generated is increased, and cooling of control substrate is a pressing issue.

As in the aforementioned conventional rotating electrical machine, heat generated by heat-generating elements such as power modules is typically dissipated through the heat sink to which the control substrate is connected. Needless to say, in order to improve heat dissipation of the heat-generating elements, the heat-generating elements are preferably directly connected to the heat sink. However, there are variations in the dimensions of each portion of the control substrate, the positions of each heat-generating element on the control substrate, the sizes of the heat-generating elements, the dimensions of the heat sink, and the like. As a result, there has been difficulties in disposing the heat-generating elements to directly abut the heat sink. In order to reduce these variations, it is necessary to strictly control the shapes and dimensional precision of each component. In this case, there are concerns that the rotating electrical machine may be difficult to manufacture, and that the manufacturing costs may increase.

In this regard, it is known that the space between the heat-generating elements and the heat sink may be filled with a thermally conductive gel. However, the gel may not be sufficiently thermally conductive. Further, when manufacturing such a rotating electrical machine, a specific gel-filling operation must be performed, and the manufacturing process may become complex.

In view of the above, it is an object of the present disclosure to provide a rotating electrical machine with superior cooling of a control substrate and that is easy to manufacture.

In view of the above, according to the present disclosure, there is provided a rotating electrical machine including a housing having at least one end in an axis of rotation direction that is open, the housing being cylindrical, a stator fixed to an inner circumferential surface of the housing, a rotor rotatably mounted in the housing to face the stator in a radial direction, a heat sink disposed in an opening of the housing, a control substrate connected to the heat sink, the control substrate including a heat-generating circuit element that controls a supply of electric power to the stator, and a heat transfer member interposed between the circuit element and the heat sink to absorb variations in a distance between the circuit element and the heat sink, the heat transfer member being configured to allow heat transfer from the circuit element to the heat sink.

According to this configuration, the heat transfer member is interposed between the circuit element and the heat sink to absorb variations in the distance between the circuit element and the heat sink, the heat transfer member being configured to allow heat transfer from the circuit element to the heat sink. Accordingly, the circuit element and the heat sink are always connected by the heat transfer member. As a result, thermal conductivity from the circuit element to the heat sink may be improved.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Embodiments (Configuration of Electric Power Steering Device)

Figure 1:
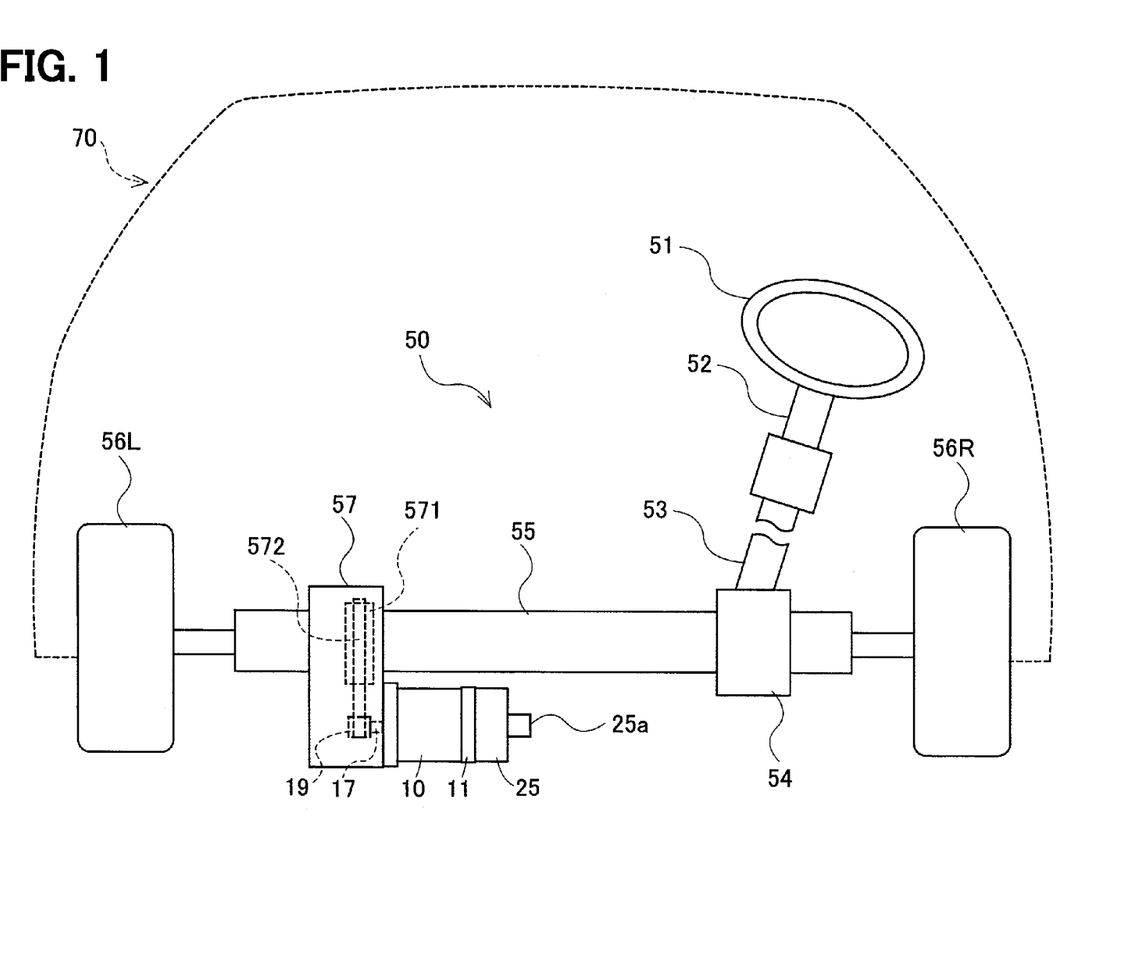
FIG. 1 is a simplified view of an electric power steering device mounted on a vehicle.

An electric power steering device 50 that includes an electric motor 10 (corresponding to a rotating electrical machine) according to a first embodiment of the present disclosure will be explained with reference to FIG. 1. As shown in FIG. 1, the electric power steering device 50 is mounted in a vehicle 70, and includes a steering wheel 51 that is rotatably operated by a driver. A steering shaft 52 connects the steering wheel 51 to an intermediate shaft 53. The intermediate shaft 53 is connected through a rack and pinion mechanism 54 to a rack shaft 55. The two ends of the rack shaft 55 are connected to a pair of steered wheels 56R, 56L (corresponding to wheels of a vehicle).

Accordingly, when the steering wheel 51 is rotatably operated, the rotation motion is transmitted through the steering shaft 52 and the intermediate shaft 53, and this rotation motion is converted by the rack and pinion mechanism 54 into a linear motion of the rack shaft 55 in an axial direction. As the rack shaft 55 moves in the axial direction, the steered wheels 56R, 56L are steered by an angle commensurate with the operation amount applied to the steering wheel 51.

The rack shaft 55 is connected to an electric motor 10 through a power transmission device 57. Specifically, the rack shaft 55 is engaged to a driven-side pulley 571 included in the power transmission device 57. The driven-side pulley 571 is rotatable with respect to the rack shaft 55, and is disposed inside the power transmission device 57 so as to be immovable in the axis of rotation direction (the left-right direction in FIG. 1). The driven-side pulley 571 is connected by a driving belt 572 to a driving-side pulley 19 of the electric motor 10. The outer diameter of the driving-side pulley 19 is configured to be smaller than the outer diameter of the driven-side pulley 571.

According to the above configuration, when the electric motor 10 is driven, rotation of the electric motor 10 is reduced by the driving belt 572 and transmitted to the driven-side pulley 571. Rotation of the driven-side pulley 571 acts as an assist force that causes the rack shaft 55 to linearly move. As a result, the electric motor 10 provides assisting steering force to the steered wheels 56R, 56L.

(Configuration of Electric Motor)

Figure 2:
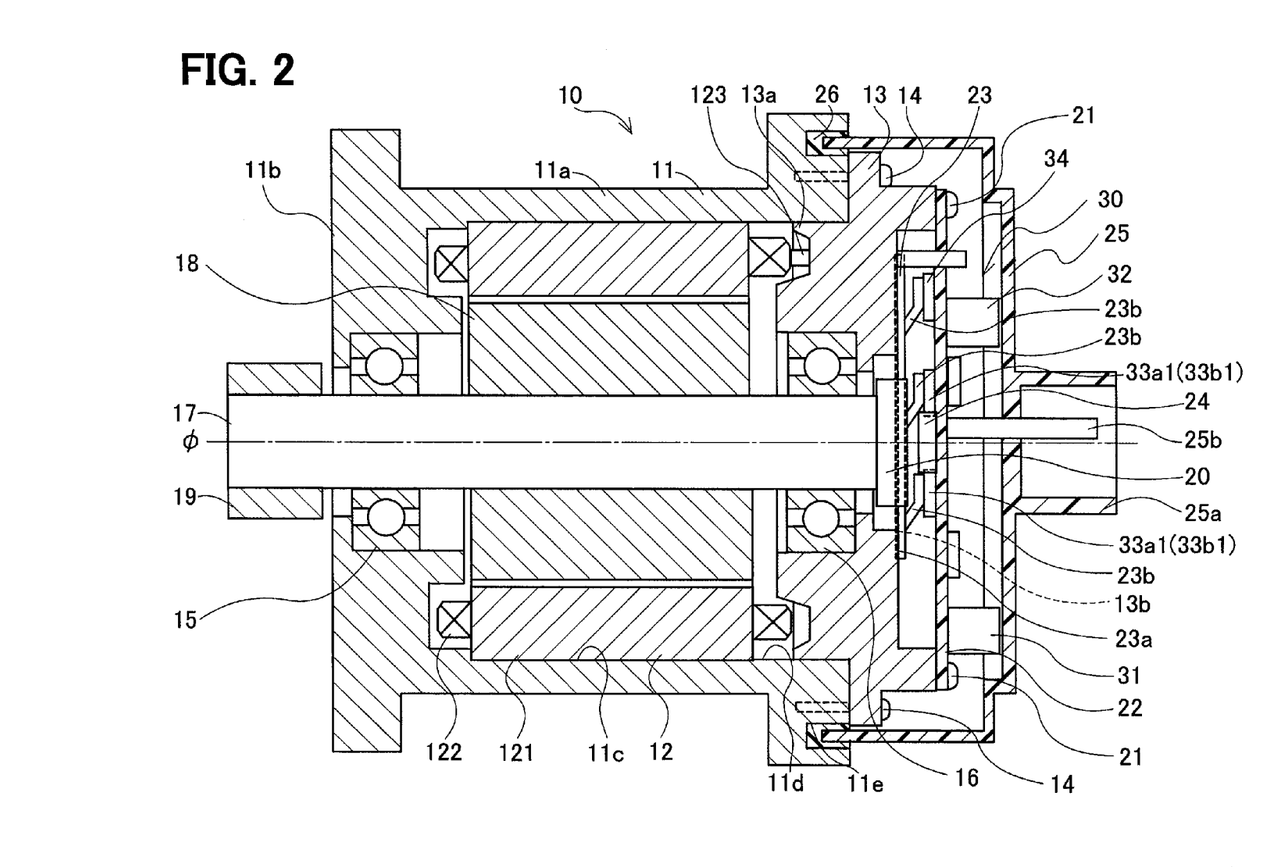
FIG. 2 is a cross sectional view along an axis of rotation of an electric motor according to a first embodiment of the present disclosure.

Next, the configuration of the electric motor 10, which is included in the electric power steering device 50, will be explained with reference to FIG. 2. In FIG. 2, the center of rotation of a rotor shaft 17 is shown as an axis of rotation ϕ. Further, in the below explanation, the direction in which the axis of rotation ϕ extends will be simply referred to as the axis of rotation direction. In addition, in the axis of rotation direction, the side closer toward the driving-side pulley 19 (i.e., the left side in FIG. 2) is the rear side of the electric motor 10, while the opposite side (i.e., the right side in FIG. 2) is the front side of the electric motor 10. The front portion of the electric motor 10 corresponds to one end in the axis of rotation direction, while the rear portion of the electric motor 10 corresponds to an other end in the axis of rotation direction. Further, a direction from the outer peripheral of the electric motor 10 toward the rotor shaft 17 will be referred to as radially inward, while the opposite direction will be referred to as radially outward.

As described above, the electric motor 10 of the present embodiment is for assisting steering in the vehicle 70 that the electric power steering device 50 is mounted in. However, the electric motor 10 of the present disclosure is not limited to such a use. The electric motor 10 may be used to drive vehicle devices aside from the electric power steering device 50, to drive general industrial machinery, to drive residential appliances, and such. Further, the electric motor 10 of the present embodiment is formed from a brushless DC motor, but is not limited to this example. The electric motor 10 may be a synchronous motor, an induction motor, or other types of electric motors.

As shown in FIG. 2, the electric motor 10 includes a frame 11 (corresponding to a housing) formed from an aluminum alloy or a resin material with good thermal conductivity. The frame 11 is substantially cylindrical shaped and is open forward in the axis of rotation direction. The frame 11 includes a cylinder portion 11a and a bottom portion 11b. The bottom portion 11b is connected to the rear end of the cylinder portion 11a in the axis of rotation direction, and extends radially inward. Alternatively, the frame 11 may be formed from only the cylinder portion 11a, with the bottom portion 11b being formed separately. A stator 12 is attached to an inner circumferential surface 11c of the cylinder portion 11a by shrink fitting or press fitting. The stator 12 is formed by winding a stator coil 122 on each teeth of a substantially cylindrical stator core 121 formed from a plurality of laminated magnetic steel sheets.

A heat sink 13 is disposed in the front end of the frame 11 to close an opening 11d (corresponding to an opening portion) of the frame 11. The heat sink 13 is formed from a metal with good heat conductivity such as an aluminum alloy, copper, or the like, and has a volume sufficient to dissipate heat generated by a control substrate 22 which will be explained later. The heat sink 13 includes a rear end portion 13a which is inserted from the opening 11d into the inside of the frame 11, and the rear end portion 13a is fitted with the inner circumferential surface 11c of the cylinder portion 11a. Fitting screws 14 penetrate the heat sink 13 to screw the heat sink 13 to the frame 11. As a result, the heat sink 13 is fixed to the frame 11.

A rear bearing 15 (corresponding to a first bearing) is mounted at an inner periphery edge of the bottom portion 11b of the frame 11. Further, a front bearing 16 (corresponding to a second bearing) is mounted at an inner periphery portion of the heat sink 13. The rotor shaft 17 (corresponding to a shaft) is rotatably mounted in the frame 11 and the heat sink 13 through the rear bearing 15 and the front bearing 16.

The rotor shaft 17 is fixedly press fit with a rotor 18. Accordingly, the rotor 18 is rotatably mounted with respect to the frame 11 and the heat sink 13. The rotor 18 is positioned to face the stator 12 in the radial direction with a fixed gap therebetween. Here, the rotor 18 is formed by placing a plurality of field pole magnets (not illustrated) within a rotor core of laminated steel sheets. As described below, when the stator coil 122 is supplied with power, a rotating magnetic field is generated. Then, the rotor 18 rotates due to the resulting attraction and repulsion forces.

Further, the driving-side pulley 19 as described previously is fixed to the rear end of the rotor shaft 17. As described previously, the driven-side pulley 571 of the power transmission device 57 is connected to the driving-side pulley 19 through the driving belt 572. Moreover, a sensor magnet 20 is attached to the front end of the rotor shaft 17.

A control substrate 22 is fixed to the front surface of the heat sink 13 by a plurality of screws 21 such that the control substrate 22 abuts the front surface of the heat sink 13. The control substrate 22 is a printed circuit board formed from epoxy resin. A controller 30 that controls a rotation of the rotor 18 is formed on the control substrate 22. As shown in FIG. 2, the controller 30 includes a choke coil 31 and a capacitor 32 formed on the front surface of the control substrate 22. In addition to these elements, FET (field effect transistor) elements 33a1, 33b1, which are MOS-FETs (metal-oxide-semiconductor field effector transistor), a plurality power supply relays 34, and the like are formed on the rear surface of the control substrate 22. The FET elements 33a1, 33b1 for two systems of inverter circuits 33a, 33b (shown in FIG. 3, corresponding to a plurality of inverter circuits) are included in an inverter 33. The FET elements 33*a*1, 33*b*1 and the power supply relays 34 control a supply of electric power to the stator 12, thereby generating heat. Thus, the FET elements 33*a*1, 33*b*1 and the power supply relays 34 collectively correspond to heat-generating circuit elements. Hereinafter, the FET elements 33*a*1, 33*b*1 and the power supply relays 34 will be collectively referred to as heat-generating elements 33*a*1, 33*b*1, 34 where appropriate. Details of the controller 30 will be explained later with reference to FIGS. 3 and 4.

Heat transfer plates 23 (corresponding to a heat transfer member) are interposed between the heat-generating elements 33*a*1, 33*b*1, 34 and the heat sink 13. Details of the heat transfer plates 23 will be explained later with reference to FIG. 5A to 6. The heat transfer plates 23 have good thermal conductivity, and allow heat from the heat-generating elements 33*a*1, 33*b*1, 34 to be transmitted to the heat sink 13. Specifically, heat from the heat-generating elements 33*a*1, 33*b*1, 34 is first transmitted through the heat transfer plates 23 to the heat sink 13, and then transmitted to the frame 11 to be dissipated.

Further, the control substrate 22 is connected to the stator coil 122 through a conductor 123 that penetrates through the heat sink 13, in order to supply electric power to the stator coil 122. As a result, heat generated at the control substrate 22 is also transmitted through the conductor 123 to the stator core 121, and this heat is then transmitted to the frame 11 to be dissipated.

A rotation angle sensor 24 is attached to the rear surface of the control substrate 22 so as to face the previously described sensor magnet 20. The rotation angle sensor 24 is formed from a magnetic resistive element or a Hall element, and detects a rotation angle of the rotor 18 by sensing changes in the magnetic field generated by the sensor magnet 20.

A motor cover 25 is connected to the front surface of the frame 11 so as to cover the control substrate 22 and the heat sink 13. The motor cover 25 is integrally formed from synthetic resins and is substantially dish shaped. An adhesive groove 11*e* is formed on the front surface of the frame 11, and is filled with a silicon-based adhesive 26. The rear end of the motor cover 25 is submerged in the adhesive 26, thereby joining the motor cover 25 to the frame 11. The joining portion between the motor cover 25 and the frame 11 forms a liquid-tight seal between the inside and outside of the electric motor 10. A waterproof connector 25*a* is formed on the front surface of the motor cover 25. A connector terminal 25*b* that protrudes frontward from the control substrate 22 is inserted into the waterproof connector 25*a*.

(Circuit Configuration of Controller)

Figure 3:
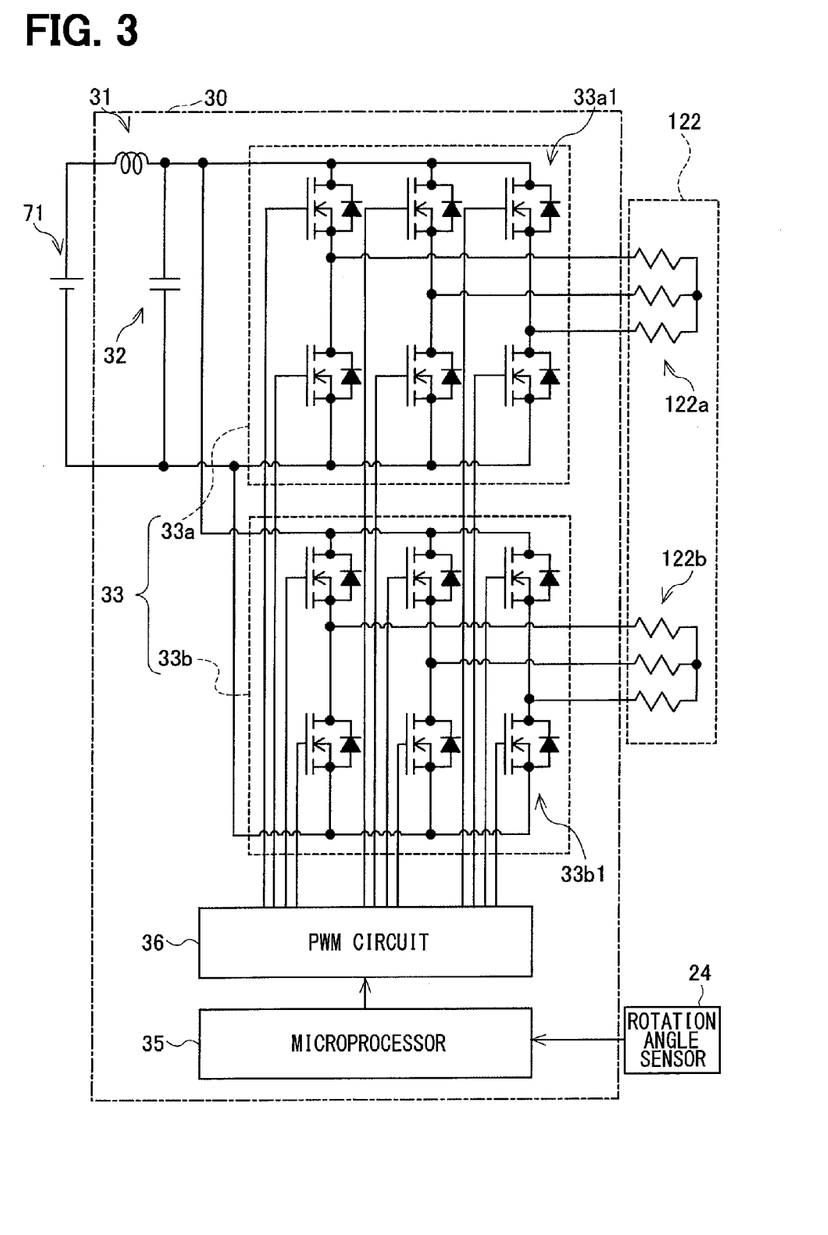
FIG. 3 is a circuit diagram of a controller of an electric motor.
Figure 4:
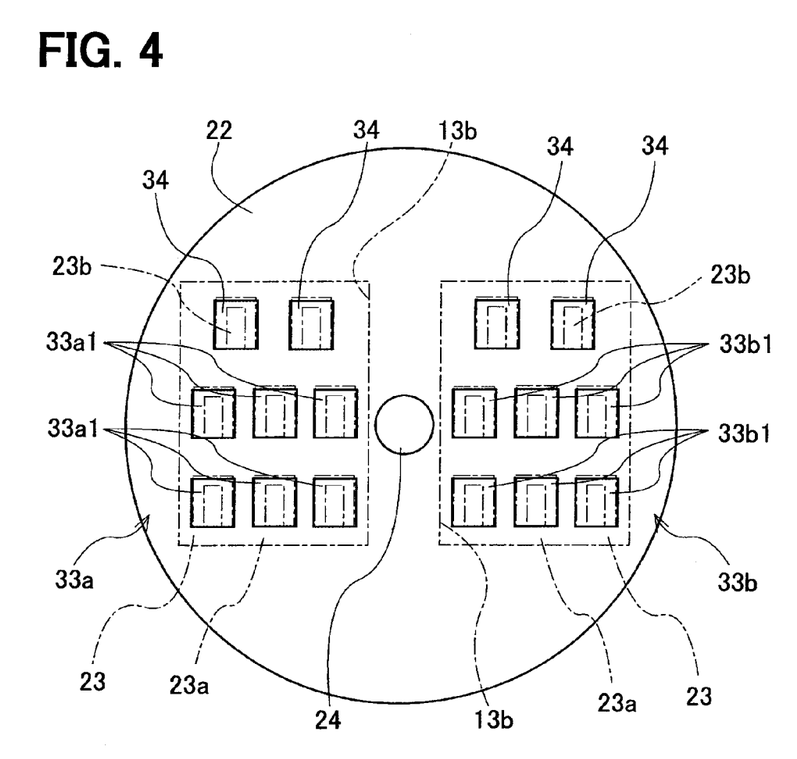
FIG. 4 is a front view from the rotor side of a control substrate.

Next, an explanation of the controller 30 formed on the control substrate 22 will be provided with reference to FIGS. 3 and 4. A vehicle battery 71 mounted on the vehicle 70 is connected to the choke coil 31 and the capacitor 32 of the controller 30. The choke coil 31 and the capacitor 32 form a filter that reduces noise leaking into the controller 30 as well as noise leaking out from the controller 30. Further, the choke coil 31 smoothes the voltage from the vehicle battery 71, and reduces the pulsations of this voltage.

As shown in FIG. 3, the previously described stator coil 122 may be formed from two sets of three-phase windings 122*a*, 122*b*. The two systems of inverter circuits 33*a*, 33*b* are connected to the three-phase windings 122*a*, 122*b*, respectively, in order to supply three-phase AC current to the three-phase windings 122*a*, 122*b*. Alternatively, the stator coil 122 may be formed from three or more sets of three-phase windings 122*a*, 122*b*, and three or more systems of inverter circuits 33*a*, 33*b* that connect to respective ones of the three or more sets of three-phase windings 122*a*, 122*b* may be formed on the control substrate 22.

Further, the rotation angle sensor 24 is connected to a microprocessor 35 included in the controller 30. The microprocessor 35 generates a three-phase voltage control signal based on detection values from the rotation angle sensor 24, a torque sensor (not illustrated) of the vehicle 70, and the like. The microprocessor 35 then sends the three-phase voltage control signal to a PWM (pulse width modulation) circuit 36. The PWM circuit 36 generates a PWM signal based on the three-phase voltage control signal, and transmits the PWM signal to the inverter circuits 33*a*, 33*b*. The FET elements 33*a*1, 33*b*1 of the inverter circuits 33*a*, 33*b* are switched according to the PWM signal, generates a requested AC voltage, and supplies the AC voltage to the three-phase windings 122*a*, 122*b*. It should be noted that in FIG. 3, only one of the FET elements 33*a*1, 33*b*1 of each inverter circuit 33*a*, 33*b* is denoted with a reference numeral.

As shown in FIG. 4, the FET elements 33*a*1, 33*b*1 are, along with the power supply relays 34, arranged in a bilaterally symmetrical manner so as to avoid the rotation angle sensor 24.

Further, in the configuration of the controller 30 shown in FIG. 3, some electric components may be omitted, and some electric components or circuits which are not illustrated may be added.

(Configuration of Heat Transfer Plate)

Next, the configuration and mounting process of the heat transfer plates 23 will be explained with reference to FIGS. 4 to 6. As shown in FIG. 4, a pair of the heat transfer plates 23 that correspond to the heat-generating elements 33*a*1, 33*b*1, 34 are disposed on the control substrate 22. Both of the heat transfer plates 23 have the same configuration as each other.

Figure 6:
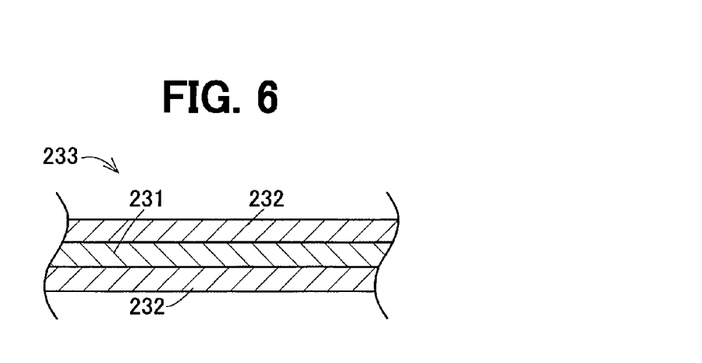
FIG. 6 is a cross-section view along line VI-VI of FIG. 5A.

As shown in FIG. 6, each of the heat transfer plates 23 is formed from a multilayer metal plate 233 including two different material types of metal plates, e.g., a copper plate 231 and a stainless steel plate 232, which are joined together. In the present embodiment, the multilayer metal plate 233 is formed from one copper plate 231 (corresponding to one of the metal plates) interposed between a pair of stainless steel plates 232 (corresponding to an other of the metal plates). In the multilayer metal plate 233, the copper plate 231 functions as a heat transfer material, while the stainless steel plates 232 function as a spring material. Alternatively, the multilayer metal plate 233 may be formed from one stainless steel plate 232 interposed between a pair of copper plates 231. Further, as long as the multilayer metal plate 233 includes at least one metal plate that has good thermal conductivity and at least one metal plate that functions as a spring, then the multilayer metal plate 233 may be formed from three or more metal plates, or from three or more different material types of metal plates being joined together.

Further, in the multilayer metal plate 233, an aluminum plate may be used in place of the copper plate 231. In addition, hard steel or other types of spring materials may be used in place of the stainless steel plates 232. The copper plate 231 and the stainless steel plates 232 may be joined together using conventional techniques, such as the techniques disclosed in JP 2006-3087 A.

Figure 5A:
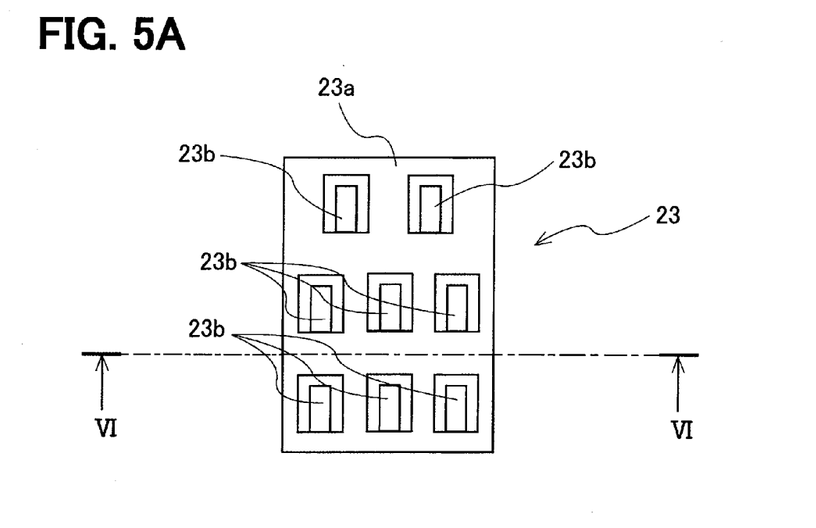
FIG. 5A is a front view of a heat transfer plate shown in FIG. 4.
Figure 5B:
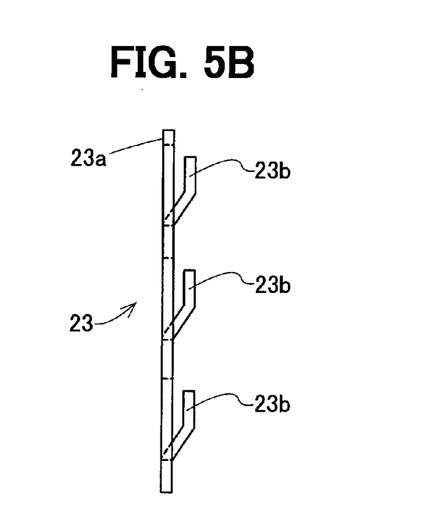
FIG. 5B is a right side view of FIG. 5A.

As shown in FIGS. 5A and 5B, each heat transfer plate 23 is formed of a frame body 23*a* (corresponding to a sink mount portion) and eight contact strips 23*b* (corresponding to one or more element contact strips). The frame body 23*a* has a rectangular outer periphery shape. The contact strips 23*b* protrude from the frame body 23*a* and are flexible in the thickness direction. It should be noted that as long as one contact strip 23*b* is provided, any number of the contact strips 23*b* may be formed on the heat transfer plate 23. Each contact strip 23*b* is press formed by cutting and raising the multilayer metal plate 233. It should be noted that in FIG. 4, only one contact strip 23*b* in each of the heat transfer plates 23 is denoted with a reference numeral.

Positioning recess portions 13*b* are formed on the front surface of the heat sink 13 (shown in FIGS. 2 and 4). The positioning recess portions 13*b* have outer shapes that match those of the frame body 23*a*. The heat transfer plates 23 are positioned on the heat sink 13 by fitting the frame body 23*a* into the positioning recess portions 13*b*.

The tips of the contact strips 23*b* of the heat transfer plates 23 abut, over a fixed surface area, respective ones of the heat-generating elements 33*a*1, 33*b*1, 34 while flexing. Since the contact strips 23*b* are flexible, this flexibility is able to absorb any variations in the distance between the heat sink 13 and the heat-generating elements 33*a*1, 33*b*1, 34. In other words, the heat transfer plates 23 are clamped and elastically retained between the heat sink 13 and the heat-generating elements 33*a*1, 33*b*1, 34.

(Assembly of Electric Motor)

Next, a simple explanation of a method of assembling the electric motor 10 will be provided with reference to FIGS. 7A to 7D. The following process is followed when assembling the electric motor 10.

Figure 7A:
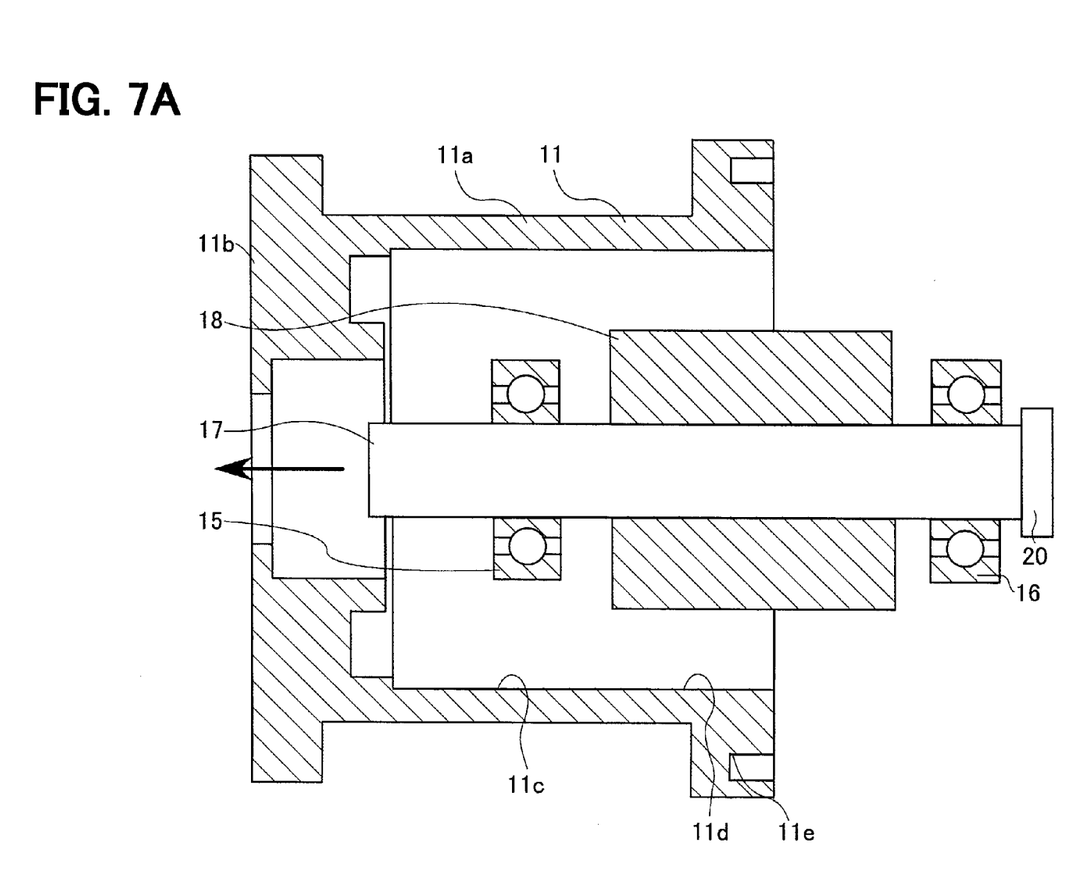
FIG. 7A is a simplified view showing an assembly process of an electric motor in which a rotor is mounted to a frame.

(i) The rotor shaft 17, which is press fit into the rotor 18, is mounted in the frame 11 along with the rear bearing 15 and the front bearing 16 (rotor mounting step: FIG. 7A).

Figure 7B:
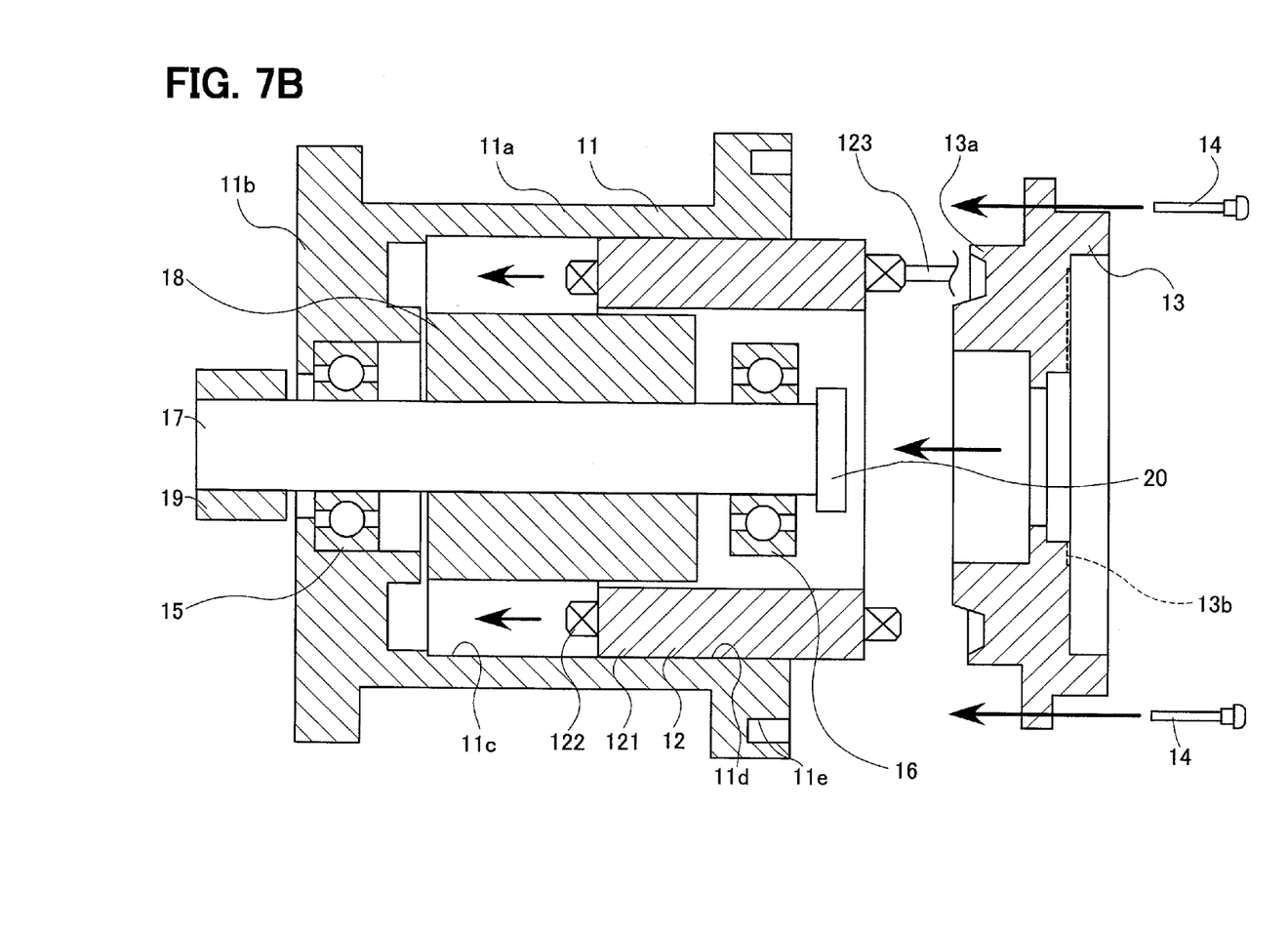
FIG. 7B shows a step of mounting a stator and a heat sink to a frame.

(ii) After inserting the stator 12 into the frame 11, the heat sink 13 is mounted in the opening 11*d* of the frame 11 using the fitting screws 14 (heat sink mounting step: FIG. 7B).

Figure 7C:
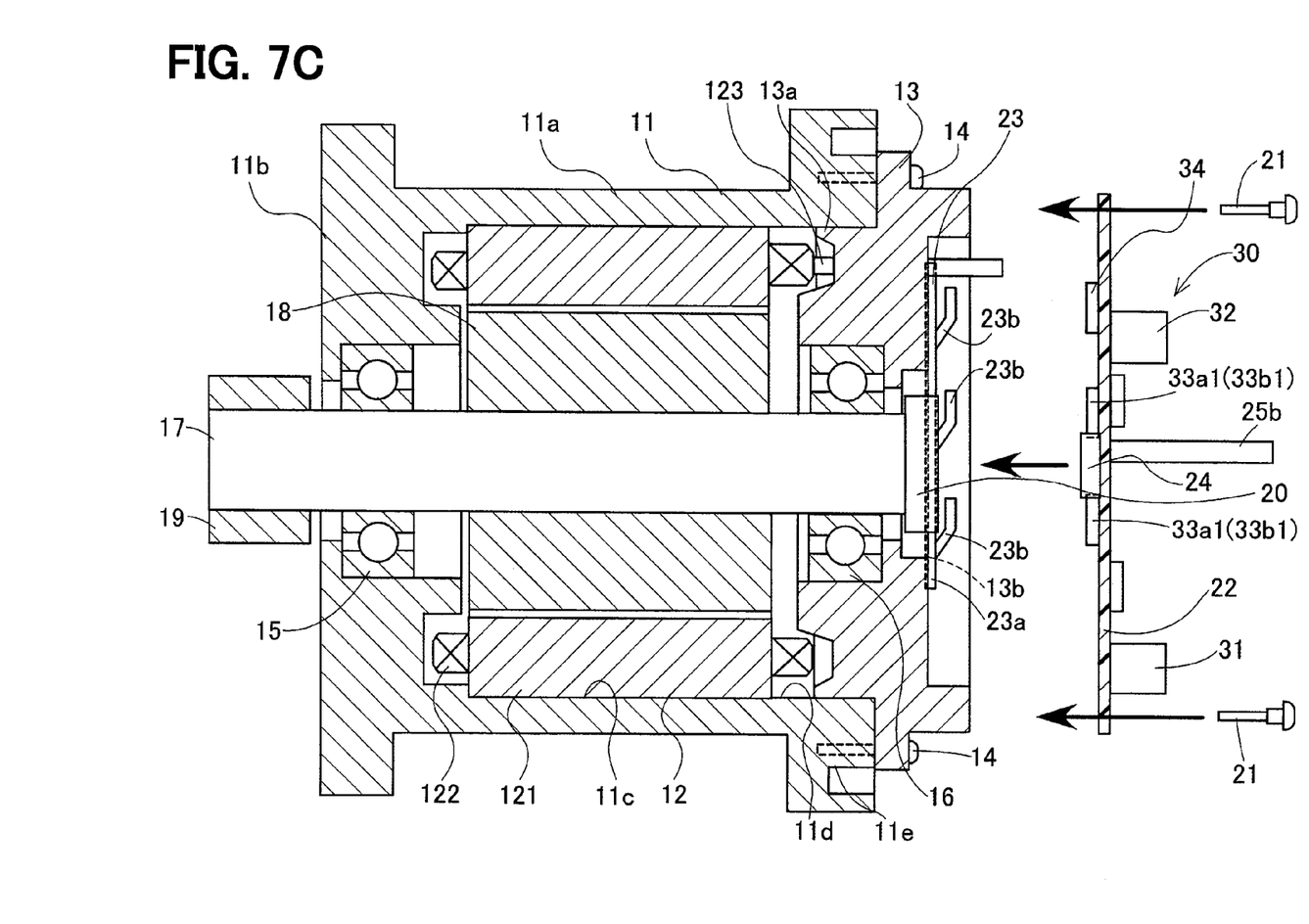
FIG. 7C shows a step of mounting a control substrate to a heat sink.

(iii) After positioning the heat transfer plate 23 on the heat sink 13, the control substrate 22 is mounted on the heat sink 13 using the screws 21 while aligning the contact strips 23*b* of the heat transfer plates 23 with the heat-generating elements 33*a*1, 33*b*1, 34 (control substrate mounting step: FIG. 7C).

Figure 7D:
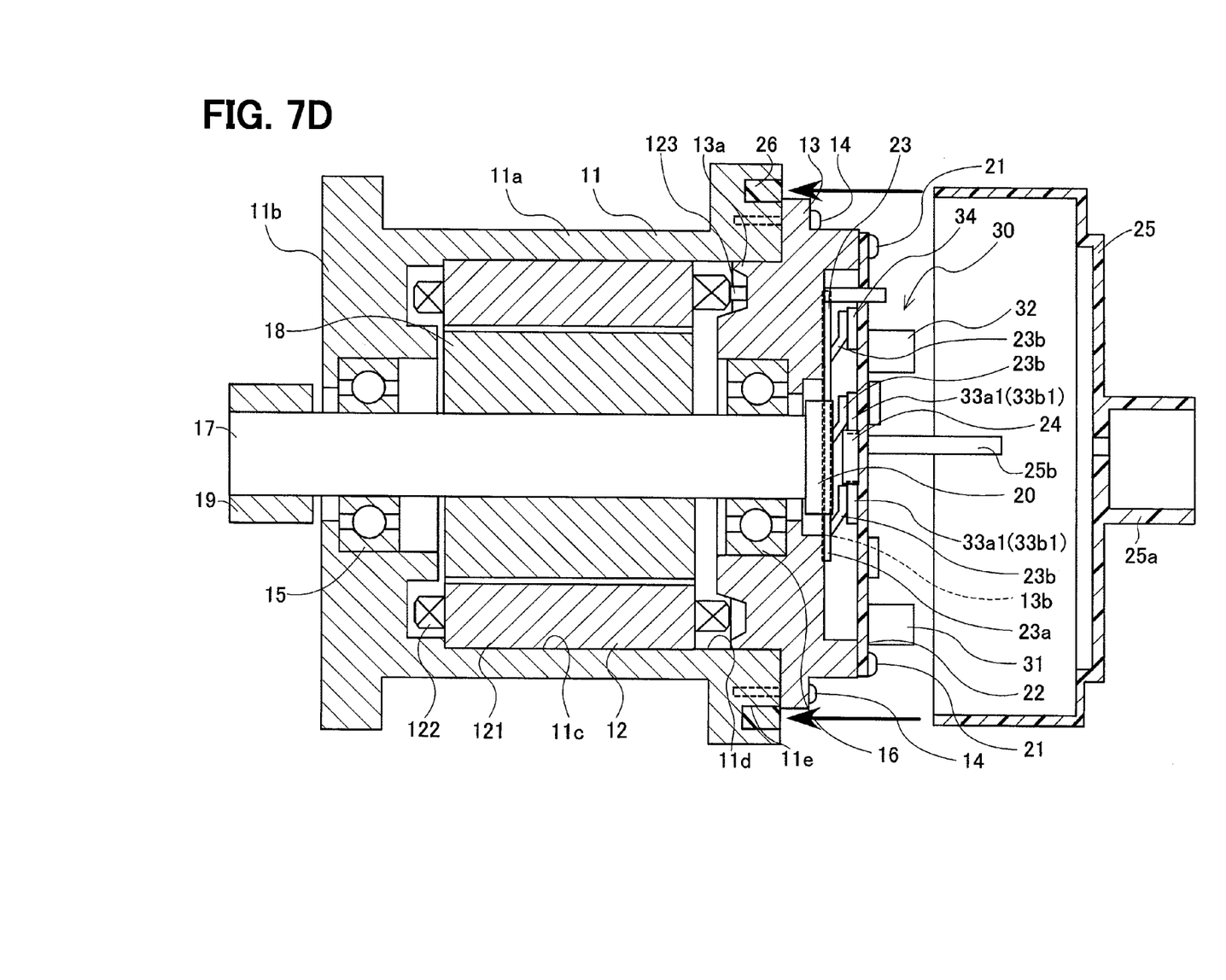
FIG. 7D shows a step of mounting a motor cover to a frame.

(iv) The motor cover 25 is mounted to the frame 11 using the adhesive 26 (motor cover mounting step: FIG. 7D).

Effects of Embodiments

According to the present embodiment, the heat transfer plates 23 are interposed between the heat-generating elements 33*a*1, 33*b*1, 34 of the control substrate 22 and the heat sink 13 to absorb variations in the distance between the heat-generating elements 33*a*1, 33*b*1, 34 and the heat sink 13. Further, the heat transfer plates 23 allows heat transfer from the heat-generating elements 33*a*1, 33*b*1, 34 to the heat sink 13. Accordingly, the heat-generating elements 33*a*1, 33*b*1, 34 are always connected to the heat sink 13 through the heat transfer plates 23 regardless of any variations in the dimensions of each portion of the control substrate 22, the positions of each of the heat-generating elements 33*a*1, 33*b*1, 34 on the control substrate 22, the sizes of the heat-generating elements 33*a*1, 33*b*1, 34, the dimensions of the heat sink 13, and the like. As a result, heat dissipation from the heat-generating elements 33*a*1, 33*b*1, 34 through the heat sink 13 may be improved. Further, it is not necessary to use a thermally conductive gel or the like to fill the space between the heat-generating elements 33*a*1, 33*b*1, 34 and the heat sink 13. As a result, the manufacturing process for the electric motor 10 may be simplified.

Further, the heat transfer plates 23 are clamped and elastically retained between the heat sink 13 and the heat-generating elements 33*a*1, 33*b*1, 34. As a result, it is not necessary to provide on the heat sink 13 a retaining member or the like for the heat transfer plates 23, and the size and weight of the electric motor 10 may be reduced. Further, due to the elasticity of the heat transfer plates 23, the heat transfer plates 23 are able to always abut the heat-generating elements 33*a*1, 33*b*1, 34 and the heat sink 13. Accordingly, thermal conductivity between the heat-generating elements 33*a*1, 33*b*1, 34 and the heat sink 13 may be maintained.

In addition, the heat sink 13 includes the positioning recess portions 13*b* that fit with the heat transfer plates 23 to position the heat transfer plates 23. Accordingly, the mounting properties of control substrate 22 to the heat sink 13 are improved while the heat transfer plates 23 are positioned on the heat sink 13. Further, the positions of the heat transfer plates 23 are prevented from slipping by resisting vibrations of the electric motor 10 caused by the rotations of the rotor 18.

Further, each of the heat transfer plates 23 is formed from a multilayer metal plate 233 in which two different types of metal plates, a copper plate 231 and a stainless steel plate 232, are joined together. Accordingly, due to the spring properties of the stainless steel plate 232, the heat transfer plates 23 are able to always abut the heat-generating elements 33*a*1, 33*b*1, 34 and the heat sink 13. Moreover, due to the copper plate 231, thermal conductivity from the heat-generating elements 33*a*1, 33*b*1, 34 to the heat sink 13 may be maintained.

In addition, each heat transfer plate 23 includes the frame body 23*a* that abuts the heat sink 13, and the contact strips 23*b* that flexibly protrude from the frame body 23*a*. The tips of the contact strips 23*b* abut the heat-generating elements 33*a*1, 33*b*1, 34 over a fixed surface area. Accordingly, the frame body 23*a* is able to abut the heat sink 13 in a stable manner, and due to the bendable contact strips 23*b*, the heat-generating elements 33*a*1, 33*b*1, 34 and the heat sink 13 may be reliably connected regardless of any variations in the distance between the heat-generating elements 33*a*1, 33*b*1, 34 and the heat sink 13. As a result, thermal conductivity between the heat-generating elements 33*a*1, 33*b*1, 34 and the heat sink 13 may be maintained at all times.

In addition, each contact strip 23*b* is press formed by cutting and raising the multilayer metal plate 233. Accordingly, the frame body 23*a* and the contact strips 23*b* may be manufactured simultaneously with a single process, and thus the heat transfer plate 23 may be manufactured in a simple manner.

Further, the rear bearing 15 is mounted at the inner periphery edge of the bottom portion 11*b* of the frame 11, and the front bearing 16 is mounted at the inner periphery portion of the heat sink 13. Then, the rotor shaft 17 is rotatably mounted in the frame 11 and the heat sink 13 through the rear bearing 15 and the front bearing 16. The rotor 18 is fixed to the rotor shaft 17. Accordingly, the rotor shaft 17 is retained between the inner peripheral edge of the frame 11 to which the stator 12 is mounted, and the inner peripheral edge of the heat sink 13 which is joined to the frame 11. As a result, the concentricity of the rotor 18 with respect to the stator 12 may be improved.

Further, the front bearing 16 is mounted on the inner periphery of the heat sink 13, and the rear bearing 15 is mounted on the bottom portion 11*b* of the frame 11. Accordingly, heat generated by the front bearing 16 may be dissipated through the heat sink 13, and heat generated by the rear bearing 15 may be dissipated through the frame 11, thereby improving heat dissipation.

Further, since the front bearing 16 is mounted to the inner periphery of the heat sink 13, it is not necessary to specifically provide a mounting member for the front bearing 16. Accordingly, the electric motor 10 may be miniaturized in the axis of rotation direction, and the number of components in the electric motor 10 may be reduced.

In addition, the electric motor 10 is included in the electric power steering device 50, and provides assisting steering force to the steered wheels 56R, 56L of the vehicle 70. Thus, since the electric motor 10 according to the configuration of the present embodiment may be miniaturized, the electric power steering device 50 of the vehicle 70 may be easily positioned within the narrow spaces around the steered wheels 56R, 56L without sacrificing performance.

In addition, the plurality of inverter circuits 33a, 33b which include the FET elements 33a1, 33b1 are formed on the control substrate 22. Accordingly, when the same torque is generated in the electric motor 10, the amount of heat generated by each of the FET elements 33a1, 33b1 may be reduced. As a result, the amount of heat transmitted through each of the heat transfer plates 23 to the heat sink 13 may be reduced, and the heat transfer plates 23 may be miniaturized.

Other Embodiments

The present disclosure is not limited to the above described embodiments, and a variety of modifications are contemplated.

The descriptions of the present disclosure may be applied to an electric generator that generates electric power at the stator 12 when the rotor 18 rotates.

Further, the descriptions of the present disclosure may be applied to an electric motor/generator that acts as both an electric generator and an electric motor.

The invention claimed is:

1. A rotating electrical machine, comprising:
a housing having at least one end in an axis of rotation direction that is open, the housing being cylindrical;
a stator fixed to an inner circumferential surface of the housing;
a rotor rotatably mounted in the housing to face the stator in a radial direction;
a heat sink disposed in an opening of the housing;
a control substrate connected to the heat sink, the control substrate including a heat-generating circuit element that controls a supply of electric power to the stator; and
a heat transfer member interposed between the circuit element and the heat sink to absorb variations in a distance between the circuit element and the heat sink, the heat transfer member being configured to allow heat transfer from the circuit element to the heat sink, wherein
the heat transfer member includes
a sink mount portion that abuts the heat sink, and
one or more element contact strips that flexibly protrudes from the sink mount portion, a tip of the one or more element contact strips abutting the circuit element over a fixed surface area, and
the heat transfer member is formed from a multilayer metal plate including at least two different material types of metal plates that are joined together.

2. The rotating electrical machine of claim 1, wherein the heat transfer member is clamped and elastically retained between the circuit element and the heat sink.

3. The rotating electrical machine of claim 1, wherein the heat sink includes a positioning recess portion that fits with the heat transfer member to position the heat transfer member.

4. The rotating electrical machine of claim 1, wherein one of the metal plates forming the multilayer metal plate is formed from copper or aluminum, and
an other metal plates forming the multilayer metal plate is formed from a spring material.

5. The rotating electrical machine of claim 4, wherein the one or more element contact strips of the heat transfer member is press formed by cutting and raising the multilayer metal plate.

6. The rotating electrical machine of claim 1, wherein the housing includes
a cylinder portion, the stator being mounted to the cylinder portion, and
a bottom portion that extends inward in the radial direction, the bottom portion being connected to an other end of the cylinder portion in the axis of rotation direction,
a first bearing is mounted at an inner periphery edge of the bottom portion,
a second bearing is mounted at an inner periphery portion of the heat sink,
a shaft is rotatably mounted in the housing and the heat sink through the first bearing and the second bearing, and
the rotor is fixed to the shaft.

7. The rotating electrical machine of claim 1, wherein the rotating electrical machine is included in an electric power steering device, and
the rotating electrical machine provides assisting steering force to wheels of a vehicle.

8. The rotating electrical machine of claim 1, wherein a plurality of inverter circuits that include the circuit element are formed on the control substrate.

9. A rotating electrical machine, comprising:
a housing having at least one end in an axis of rotation direction that is open, the housing being cylindrical;
a stator fixed to an inner circumferential surface of the housing;
a rotor rotatably mounted in the housing to face the stator in a radial direction;
a heat sink disposed in an opening of the housing;
a control substrate connected to the heat sink, the control substrate including a heat-generating circuit element that controls a supply of electric power to the stator; and
a heat transfer member interposed between the circuit element and the heat sink to absorb variations in a distance between the circuit element and the heat sink, the heat transfer member being configured to allow heat transfer from the circuit element to the heat sink, wherein
the heat transfer member is formed from a multilayer metal plate including at least two different material types of metal plates that are joined together,
one of the metal plates forming the multilayer metal plate is formed from copper or aluminum, and
an other of the metal plates forming the multilayer metal plate is formed from a spring material.

* * * * *